(12) United States Patent
Van Leeuwen

(10) Patent No.: US 7,424,683 B2
(45) Date of Patent: Sep. 9, 2008

(54) OBJECT ENTRY INTO AN ELECTRONIC DEVICE

(75) Inventor: Marco Van Leeuwen, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 711 days.

(21) Appl. No.: 10/514,594

(22) PCT Filed: Apr. 23, 2003

(86) PCT No.: PCT/IB03/01710

§ 371 (c)(1),
(2), (4) Date: Nov. 16, 2004

(87) PCT Pub. No.: WO03/098417

PCT Pub. Date: Nov. 27, 2003

(65) Prior Publication Data

US 2006/0095844 A1 May 4, 2006

(30) Foreign Application Priority Data

May 21, 2002 (EP) .................................. 02076985

(51) Int. Cl.
*G06F 15/00* (2006.01)
*G06F 13/00* (2006.01)

(52) U.S. Cl. ..................................... 715/759; 715/863

(58) Field of Classification Search .................. 715/700, 715/759, 834, 840, 863, 856, 862
See application file for complete search history.

(56) References Cited

U.S. PATENT DOCUMENTS

| | | | | |
|---|---|---|---|---|
| 5,940,076 A | * | 8/1999 | Sommers et al. | 715/834 |
| 6,011,542 A | | 1/2000 | Durrani et al. | |
| 6,907,581 B2 | * | 6/2005 | Noy et al. | 715/863 |

FOREIGN PATENT DOCUMENTS

| | | |
|---|---|---|
| EP | 1168780 A | 1/2002 |
| GB | 2332293 A | 6/1999 |
| WO | WO0057265 A | 9/2000 |

* cited by examiner

*Primary Examiner*—Cao "Kevin" Nguyen

(57) ABSTRACT

A system for entering objects from a set of objects into an electronic device is arranged to determine a first pointer position (11) on a display (10) and display, surrounding the first point position, a first plurality of individually selectable fields (12), each of which represents a subset of objects from the set of objects. Selection of a subset is performed by moving the pointer to the field (12a) containing the desired subset. The system then alternately displays, surrounding a selected field (12a), at least one additional plurality of individually selected fields (13), each of which represents either an individual object or a further subset of objects from the subset of objects represented in the previously selected field, and moving the pointer for selecting an additional field, until a field (13a) which represents an individual object has been selected. The selected individual object can then be entered by the user.

20 Claims, 5 Drawing Sheets

OBJECT ENTRY INTO AN ELECTRONIC DEVICE

BACKGROUND OF THE INVENTION

1. Field of the Invention

The present invention relates to the field of entering objects into an electronic device comprising a display screen, and particularly to a method and apparatus for entering objects, such as graphical characters, into a small or portable electronic appliance which does not have a conventional alphanumeric keyboard with discrete keys. More specifically, the invention relates to an efficient system for entering objects from a large set of objects when the surface space that is available for entering the objects is relatively limited, such as on a cellular telephone, or in a personal digital assistant. The present invention also relates to a computer program product comprising software code portions for achieving the system, and a method for entering objects into a small or portable electronic appliance when said product is run on a computer.

2. Description of the Related Art

Recently, the proliferation of the number of small or handheld electronic appliances has brought many challenges to users who want to efficiently enter data into the memory of such devices. For example, consider the many different types of devices, such as, personal digital assistants (PDAs) (also known as personal information managers); personal communication devices (e.g., mobile phones); laptop personal computers; multifunctional remote controls; web-tablets, to name a few, which help users store and organize information. Lately, the trend has been towards an ever-increasing reduction of the size of such devices. However, this reduction of size has resulted in the problem that data entry into these devices is often very difficult.

It is commonplace to provide these kinds of devices with various systems for facilitating text input. One system commonly used with mobile phones is to let each numerical key of the mobile phone represent up to four characters, which enables the user to input a specific character by depressing the appropriate key a number of times corresponding to the desired character. In the case of personal digital assistants, a text entry system based on handwriting interpretation, often requiring the user to apply a specific writing style, has been commonly used. Other appliances provide, on a touch-sensitive screen, a virtual alphanumeric keyboard for character input, which the user uses, often with a stylus, to select characters for input.

One prior-art approach to providing a graphical text entry system has been to display a graphical text entry wheel on a graphical text entry screen. A plurality of characters is positioned on the graphical text entry wheel. The system also includes a pointing device for rotating the graphical text entry wheel to allow a user to select one of the characters on the graphical text entry wheel to be entered. After selection of one or more characters, the graphical text entry system may provide suggested subsequent characters or words as aids for text entries. A system of this type is disclosed in U.S. Pat. No. 6,011,542 to Sony.

SUMMARY OF THE INVENTION

Accordingly, it is an object of the present invention to provide an improved system for entering objects, such as graphical characters, into a small electronic appliance.

Another object of the invention is to provide an unproved system for entering graphical characters into a small electronic appliance also providing word suggestions as aids for text entries.

A further object of the invention is to provide an improved system for entering objects into a small electronic appliance in which the objects can be entered by using small movements of a finger or stylus on a touch-sensitive screen.

A still further object of the invention is to provide an improved system for entering objects into a small electronic appliance, wherein selection and entry of individual objects is effected on individually selectable fields requiring only a limited amount of space to be depicted on the display screen of the small information appliance.

Yet another object of the invention is to provide an improved system for entering objects into a small electronic appliance which allows a user to enter any individual object from a large set of objects.

A still further object of the invention is to provide an improved computer program product comprising software code portions for achieving the system and a method for entering objects into a small or portable electronic appliance when said product is run on a computer.

Further objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

In the drawings, wherein like reference characters denote similar elements throughout the several views.

DESCRIPTION OF THE PREFERRED EMBODIMENTS

Figure 1:
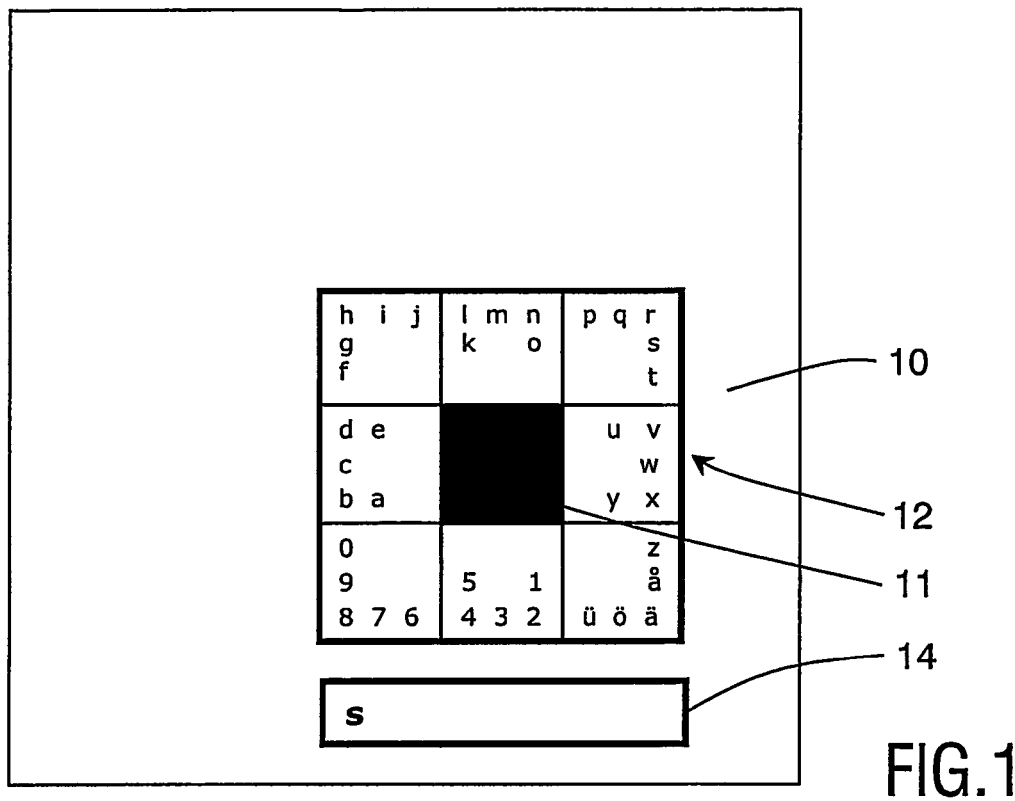
FIG. 1 is a top plan view of a highest level of individually selectable fields, each of which represents a subset of objects from a larger set of objects, here illustrated as subsets of graphical characters from a larger character set.

FIG. 1 shows a graphical display screen 10 displaying a highest level view of a graphical user interface system for entering objects from a set of objects into an electronic device according to an embodiment of the present invention. The graphical display screen 10 of the electronic device comprises display means, where the display means may be any commonly used type of display, such as: a liquid crystal display; a plasma screen display; an electrochromic display; a cathode ray display. The display means is preferably touch-sensitive. The electronic device also comprises user input means (not shown) such as a stylus and touch-pad or touch-sensitive screen; a user's finger and touch-pad or touch-sensitive screen, or any combination of the above. Alternatively, other user input means may be provided for use with a screen which is not touch-sensitive, such as the keys of a handset of a wireless communications system; the keys of a remote control appliance; a joystick, trackball or computer mouse, or any combination of the above. This alternative might, however, require some minor adjustments of the supporting graphics in addition to what will be described below.

For ease of understanding, the current embodiment will be described with reference to an electronic device comprising a touch-sensitive display screen and a stylus and/or user's finger for providing user input to the electronic device by performing operations on the graphical user interface of the object entry system.

Figure 2:
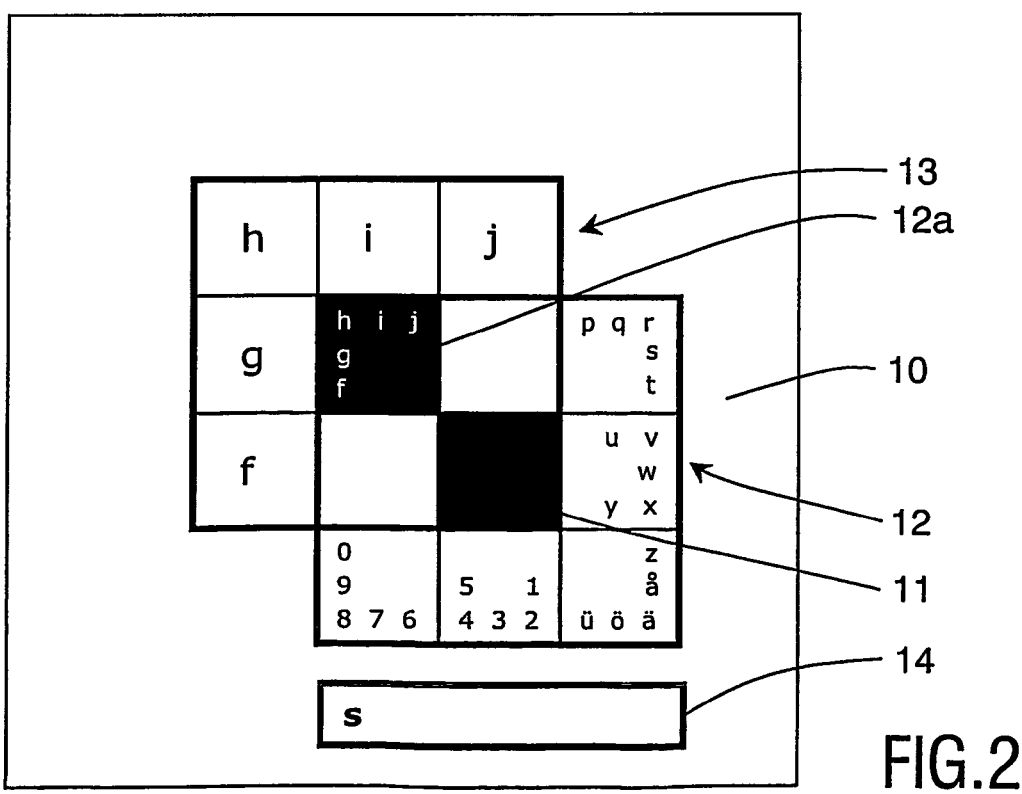
FIG. 2 is a top plan view of a subordinate level of individually selectable fields, each of which represents an individual character from the subset of graphical characters represented in the fields of FIG. 1.

Upon sensing placement by the user of the stylus and/or finger, hereinafter 15 referred to as pointer, in a position on the screen 10, the display means is operatively arranged for sensing the point of placement to determine a first pointer position 11 and displaying, surrounding the first pointer position 11, a first plurality of individually selectable fields 12 representing a highest level of the graphical user interface. As shown in FIG. 1, these fields 12 are represented as rectangular or square boxes, but could alternatively take any suitable form or shape, such as circular, triangular or circle sectors. Each of these fields 12 represents a subset of objects from a larger set of objects. For ease of understanding, the objects are here illustrated as graphical characters from a larger set of characters, e.g., as shown in FIG. 1, the alphabet from a to z and some additional country-specific characters. It is, however, intended that the objects may be objects from other kinds of data collections commonly occurring in these types of devices, e.g., the set of objects could be a set of contact data and the individual objects contact data representative of an individual contact or, alternatively, the set of object could represent a top level folder, containing any number of subordinate folders with either further subordinate folders or individually selectable objects representative of items or functions, which are accessible through the user interface of the electronic device. The input means is then operatively arranged to allow movement of the pointer to either of the first individually selectable fields 12 through the user moving the pointer, kept in contact with the touch-sensitive screen 10, to the field representing the desired subset of characters, illustrated in FIG. 2 as the blackened field 12a containing the characters f through j, for performing a selection of the indicated field. When this selection has been performed, said display means is further, operatively arranged to alternate by display, surrounding a selected field, of an additional plurality of individually selectable fields 13, each of which additional individually selectable fields 13 represents either an individual character or a further subset of characters (not shown) from the subset of graphical characters represented in the previously selected field and allowing movement of the pointer, kept in contact with the touch-sensitive screen, to either of the additional individually selectable fields 13 until the additional field selected represents an individual character, illustrated in FIG. 3 as the blackened field 13a containing the character "h". In this manner, any number of subordinate levels of individually selectable fields can be provided, even if the embodiment, shown here as an example, only illustrates one subordinate level. As shown in FIG. 2, only the fields, which are displayed, non-overlaid the fields from the first plurality of individually selectable fields 12 contain a character and are thus selectable. It is of course possible to let all additional fields 13 comprise a character, but the shown way of presentation is preferred, as this facilitates an overview of the graphical user interface by the user and allows the user to perform a reverse movement of the pointer to the previous level to cancel a performed selection. As an alternative, all fields but one from a previous level could be removed completely, which would still provide help in performing this reverse movement, or all previous level fields could be removed and replaced with an indication of a move direction for returning to a previous level. The input means is further operatively arranged to allow performance of entry of the graphical character represented in the selected additional field 13a through the user lifting the pointer from the touch-sensitive screen, whereupon the graphical character selected is entered to a text entry field 14 of the graphical user interface and the displayed fields are removed. The text entry field 14 of FIGS. 1 to 3 as illustrated contains a previously entered character, here illustrated as the character "s", for the purpose of facilitating the following description. Upon the user lifting the pointer from the touch-sensitive screen, in the case illustrated in FIG. 3, the character "h" is entered into the text entry field 14 after the character "s".

Figure 5:
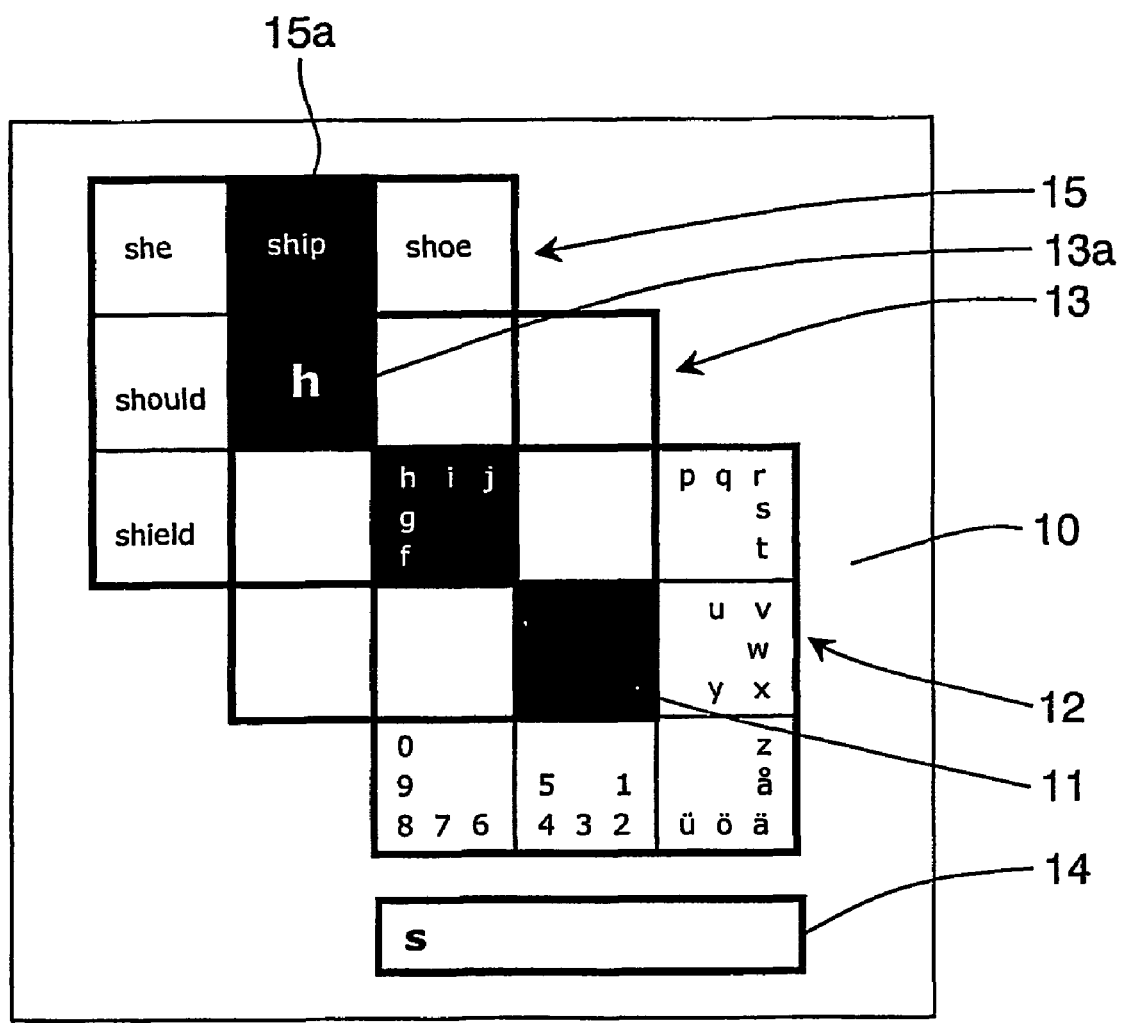
FIG. 5 is a top plan view illustrating selection of an individual word from the candidate words represented in the further subordinate level of individually selectable fields of FIG. 4.

According to a further embodiment of the system for entering objects being graphical characters from a character set into an electronic device, the system is arranged to provide word suggestions as aids for text entries. In addition to what has been described with reference to FIGS. 1, 2 and 3, the system according to this second embodiment further comprises dictionary storage means (not shown), such as any conventional type of memory, e.g., RAM-memory circuits, ROM-memory circuits, a magnetic memory device (such as a hard-disk drive) or an optical memory device (such as a CD-ROM or DVD reader). The dictionary storage means store a plurality of candidate words. The system further comprises retrieval means (not shown) for retrieving a subset of candidate words from the dictionary storage means. The retrieval means preferably comprises a microprocessor and software code portions for performing the retrieval process when executed on said microprocessor. The subset of candidate words is retrieved on the basis of either the character represented in the selected additional field or the character represented in the selected additional field and at least one previously entered character, as illustrated by the character "s" in the text entry field 14 of FIGS. 1, 2 and 3. After said subset of candidate words has been retrieved, the display means is operatively arranged to display, surrounding the selected additional field 13a, a further plurality 15 of individually selectable fields representing a further subordinate level of the graphical user interface. Each of the further individually selectable fields 15 represents one candidate word from the subset of candidate words. The input means is also operatively arranged to allow movement of the pointer to either of the further individually selectable fields 15 through the user moving the pointer, kept in contact with the touch-sensitive screen 10, to the field representing the desired candidate word, illustrated in FIG. 5 as the blackened field 15a containing the word "ship", for performing a selection of the indicated further field. The input means is further operatively arranged to allow performance of entry of the candidate word represented into the selected further field 15a through the user lifting the pointer from the touch-sensitive screen 10, whereupon the candidate word selected is entered into the text entry field 14 of the graphical user interface replacing the previously entered character, shown as the character "s" in FIG. 5.

In both of the above embodiments, the input means is operatively arranged to allow reverse movement of the pointer through the user moving the pointer, kept in contact with the touch-sensitive screen, from a currently selected field to a previous pointer position for cancelling a performed selection. Upon such cancellation, presentation of any fields initiated through the previous selection is cancelled.

As illustrated in FIGS. 1 and 2, the display means of this embodiment is operatively arranged to display the individual characters represented in the additional plurality of individually selectable fields with an enlarged font size as compared to the font size of the subset of graphical characters represented in the first plurality of individually selectable fields. In an alternative embodiment (not shown), the same font size could be used to present all characters.

In yet a further embodiment (not shown), in order to facilitate the users overview of the user interface, the display means can be operatively arranged to provide a magnified version of the additional plurality of individually selectable fields 13 in response to using the input means to initiate movement of the pointer towards either of the additional individually selectable fields 13.

Figure 3:
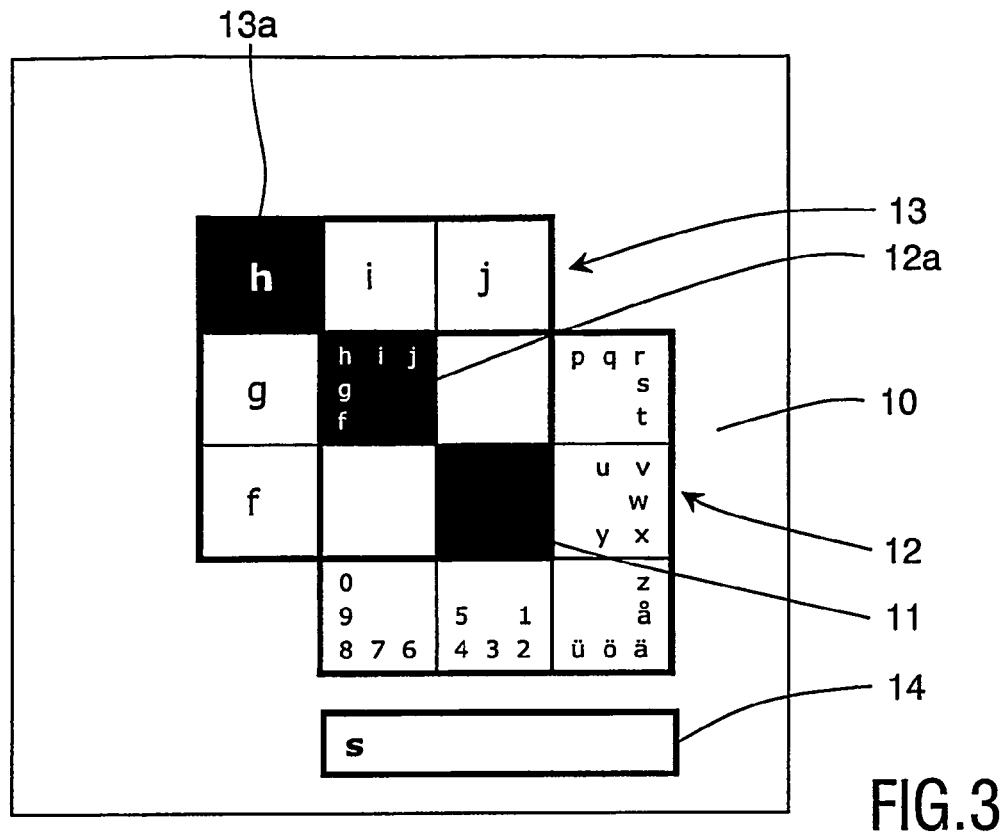
FIG. 3 is a top plan view illustrating selection of an individual graphical character from the characters represented in the subordinate level of individually selectable fields of FIG. 2.
Figure 4:
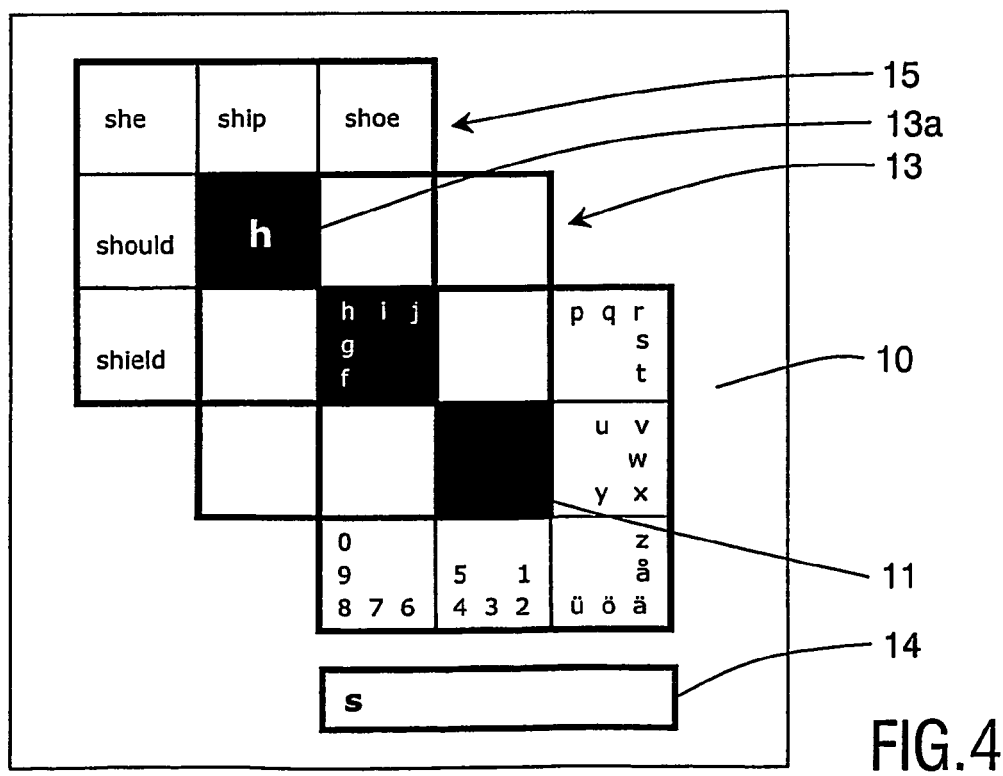
FIG. 4 is a top plan view illustrating a further subordinate level of individually selectable fields, each of which represents one candidate word for entry according to a second embodiment of the present invention.

As evidenced by the embodiment illustrated in FIGS. 1 to 3, the display means is operatively arranged to display the additional plurality of individually selectable fields 13 at least partially overlaid with the previously displayed first plurality of individually selectable fields 12.

In yet a further embodiment (not shown) the system for entering objects from a set of objects into an electronic device is arranged in a handset of a wireless communication system, such as a mobile phone. In this embodiment, as an alternative in the case of the display 10 not being touch-sensitive, pointer movement and entry could be controlled by the user depressing designated keys from the plurality of keys commonly occurring on such devices.

Instead of being arranged in the handset of a wireless communication system, the system for entering objects from a set of objects into an electronic device may alternatively be arranged in a personal digital assistant, a remote control appliance or any type of handheld electronic device. Depending on the characteristics of the device pointer, movement could be effected by the user using alternative input means, such as the keys of a remote control appliance; a joystick, trackball or computer mouse; a stylus and touch-pad or touch-sensitive screen; a user's finger and touch-pad or touch sensitive screen, or any combination of the above.

Figure 6:
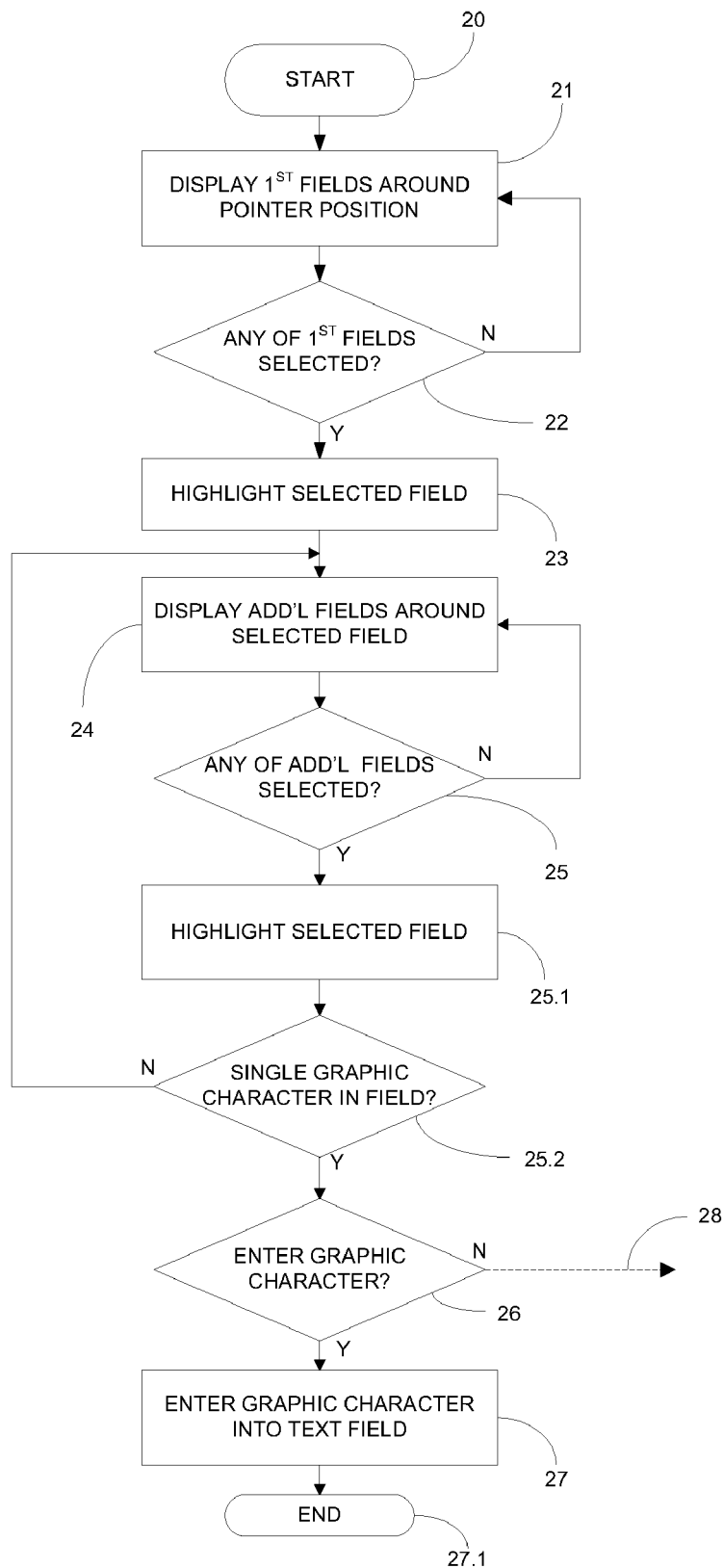
FIG. 6 is a flowchart of the method for entering objects of the embodiment of FIGS. 1 through 3.

FIG. 6 is a flowchart of the method for entering objects from a set of objects, here illustrated as graphical characters from a character set, into an electronic device according to an embodiment of the present invention.

In order to begin entering graphical characters into the electronic device, the user initiates the input process. In the embodiment described above, this is accomplished by the user placing the point of the pointer on the touch-sensitive screen. In other embodiments, initiation can be accomplished in any number of ways, e.g., simply by turning on the device or by pressing a dedicated key on the device or by touching a dedicated area on a touch-sensitive screen or touch-pad.

Upon determining that the user has initiated the input process (step 20), the system determines a first pointer position and displays on the display, surrounding the first pointer position, a first plurality of individually selectable fields, each of which represents a subset of graphical characters from the character set (step 21). Thereafter, it is determined if the user has input commands for moving the pointer to either of the first individually selectable fields for selection of the indicated field (step 22), and the selected field is highlighted (step 23). Once this is done, the system displays on the display, surrounding a selected field, an additional plurality of individually selectable fields (step 24), each of which either represents an individual character or a further subset of characters from the subset of graphical characters represented in the previously selected field, and determines if the user has input commands for moving the pointer to either of the additional individually selectable fields for selection (step 25) and highlights the indicated additional field (step 25.1). It is then determined whether there is a single graphic character in the selected field (step 25.2). If not, the system reverts to step 24. If it is determined that the additional field selected represents an individual graphical character, it is thereafter determined if the user has input commands for performing an entry of the graphical character represented in the selected additional field (step 26), whereupon the selected graphical character is entered into a text entry field of the graphical user interface (step 27) and the displayed fields are removed (step 27.1). Also envisaged is a further enhanced embodiment for providing word suggestions as aids for text entries, which is illustrated in FIG. 7, the flowchart therein being coupled to the flowchart of FIG. 6 through the broken-line arrow 28 at step 26.

Figure 7:
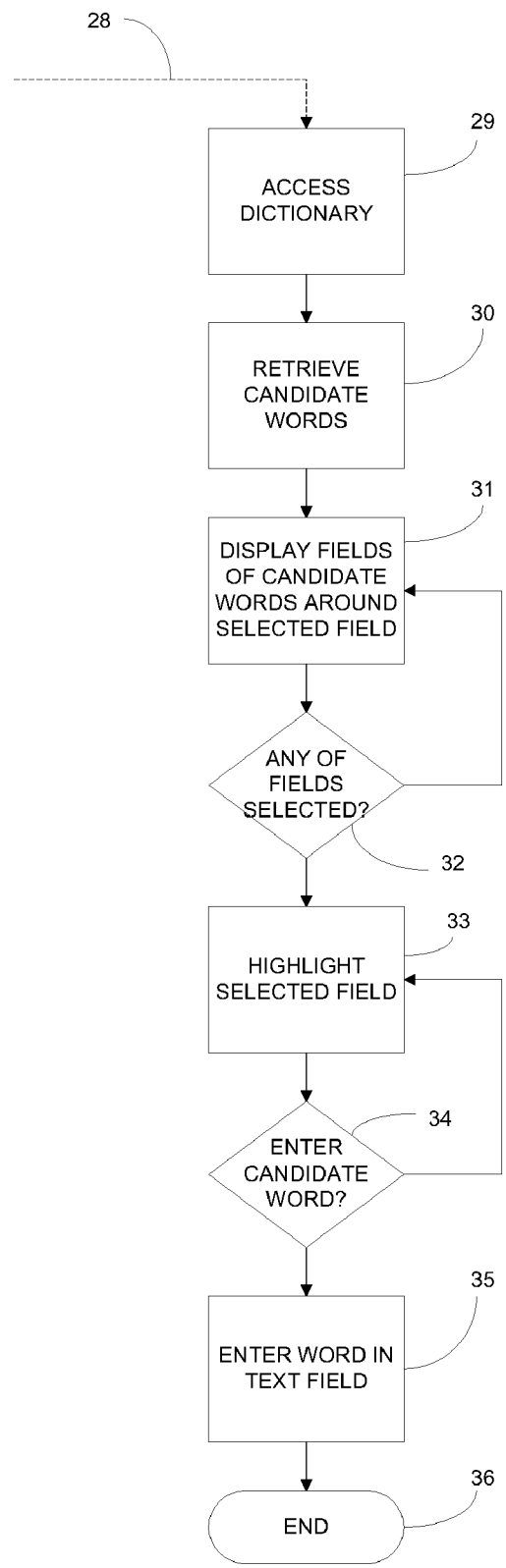
FIG. 7 illustrates an extension of the flowchart of FIG. 6 depicting the method for providing word suggestions as aids for text entries according to the embodiment of FIGS. 4 and 5.

In FIG. 7, when the user has no input commands for performing an entry of the graphical character represented in the selected additional field, the process flow is continued via the broken-line arrow 28 as follows. Dictionary storage means storing a plurality of candidate words is accessed (step 29) and a subset of candidate words is retrieved from the dictionary storage means based on either the character represented in the selected additional field, or the character represented in the selected additional field and at least one previously entered character (step 30). Thereafter, the system displays on the display, surrounding the selected additional field, a further plurality of individually selectable fields, each of which represents one candidate word from the subset of candidate words (step 31). As a next step, it is determined if the user has input commands for moving the pointer to either of the further individually selectable fields for performing a selection of the indicated further field (step 32), this field being then highlighted (step 33). It is thereafter determined if the user has input commands for performing an entry of the candidate word represented in the selected further field (step 34), whereupon this word is entered into a text entry field of the graphical user interface (step 35), replacing any previously entered character(s) used for retrieving the candidate words. The process thus ends at step 36.

Thus, while fundamental novel features of the invention as applied to a preferred embodiment thereof have been shown, described and pointed out, it will be understood that various omissions and substitutions and changes in the form and details of the devices illustrated, and in their operation, may be made by those skilled in the art without departing from the spirit of the invention. For example, it is expressly intended that all combinations of those elements and/or method steps, which perform substantially the same function in substantially the same way to achieve the same results, be within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the appended claims.

The invention claimed is:

1. A system for selecting and entering objects from a set of objects into an electronic device, said system comprising:
   display means and input means, wherein said input means are operatively arranged to determine an initial point position, said display means are operatively arranged for display, surrounding the initial point position, a first plurality of individually selectable fields, each of which represents a subset of objects from the set of objects, said input means are operatively arranged to allow movement of the pointer to either of the first individually selectable fields for performing a selection of the indicated field, the display and input means being further operatively arranged to alternately display, surrounding a selected field, an additional plurality of individually selectable fields, each of which represents either an individual object or a further subset of objects from the subset of objects represented in the previously selected field and allowing movement of the pointer to either of the additional individually selectable fields for performing a selection of the indicated additional field until the additional field selected represents an individual object, whereupon said input means are further operatively arranged to allow performance of entry of this individual object into the electronic device.

2. The system of claim 1, wherein the set of objects is a set of graphical characters and an individual object is an individual graphical character.

3. The system of claim 2, further comprising:
   dictionary storage means storing a plurality of candidate words, retrieval means for retrieving a subset of candidate words from the dictionary storage means based either on the character represented in the selected additional field or on the character represented in the selected additional field and at least one previously entered character, wherein said display means are operatively arranged to display, surrounding the selected field representing an individual character, a further plurality of individually selectable fields, each of which represents one candidate word from the subset of candidate words, said input means are operatively arranged to allow movement of the pointer to either of the further individually selectable fields for performing a selection of the indicated further field, whereupon said input means are further operatively arranged to allow performance of entry of the candidate word represented in the selected further field.

4. The system of claim 2, wherein said display means are operatively arranged to display the individual characters represented hi the additional plurality of individually selectable fields with an enlarged font size compared to the font size of the subset of graphical characters represented in the first plurality of individually selectable fields.

5. The system of claim 1, wherein said input means are operatively arranged to allow reverse movement of the pointer from a currently selected field to a previous pointer position for annulling a performed selection.

6. The system of claim 1, wherein said display means are operatively arranged to provide a magnified version of the additional plurality of individually selectable fields in response to use of the input means to initiate movement of the pointer towards either of the additional individually selectable fields.

7. The system of claim 1, wherein said display means are operatively arranged to display the additional plurality of individually selectable fields and at least partially overlaid, the previously displayed plurality of individually selectable fields.

8. The system of claim 1, wherein said display means and said input means are arranged in a handset of a wireless communication system.

9. The system of claim 1, wherein said display means and said input means are arranged in a personal digital assistant.

10. The system of claim 1, wherein said display means and said input means are arranged in a handheld electronic device.

11. The system of claim 1, wherein said display means and said input means are arranged in a remote control appliance.

12. A method for entering objects from a set of objects into an electronic device, the method comprising the steps of:
   determining a first pointer position and displaying on a display, surrounding the first pointer position, a first plurality of individually selectable fields, each of which represents a subset of objects from the set of objects;
   moving the pointer to either of the first individually selectable fields for selection of the indicated field;
   alternately displaying on the display, surrounding a selected field, an additional plurality of individually selectable fields, each of which either represents an individual object or a further subset of objects from the subset of objects represented in the previously selected field, and moving the pointer to either of the additional individually selectable fields for selection of the indicated additional field until the additional field selected represents an individual object;
   performing an entry into the electronic device of this individual object.

13. The method of claim 12, wherein the set of objects is a set of graphical characters and an individual object is an individual graphical character.

14. The method of claim 13, further comprising the steps of:
   providing dictionary storage means for storing a plurality of candidate words;
   providing retrieval means for retrieving a subset of candidate words from the dictionary storage means based either on the character represented in the selected additional field or on the character represented in the selected additional field and at least one previously entered character;
   displaying on the display, surrounding the selected additional field, a further plurality of individually selectable fields, each of which represents one candidate word from the subset of candidate words;
   moving the pointer to either of the further individually selectable fields for performing a selection of the indicated further field;
   performing an entry of the candidate word represented into the selected further field.

15. The method of claim 13, wherein said step of moving the pointer further allows a reverse movement of the pointer from a currently selected field to a previous pointer position for annulling a performed selection.

16. The method of claim 13, wherein said step of displaying on the display, surrounding the selected field, an additional plurality of selectable fields further comprises displaying the individual characters represented in the additional plurality of individually selectable fields with an enlarged font size compared to the font size of the subset of graphical characters represented in the first plurality of individually selectable fields.

17. The method of claim 13, wherein said step of displaying on the display, surrounding the selected field, an additional plurality of selectable fields further comprises providing, for display, a magnified version of the additional plurality of individually selectable fields in response to movement of the pointer towards either of the additional individually selectable fields.

18. The method of claim 13, wherein said step of displaying on the display, surrounding the selected field, an additional plurality of selectable fields further comprises displaying the additional plurality of individually selectable field, and, at least partially, overlaid the previously displayed plurality of individually selectable fields.

19. A computer program product stored on a computer-readable storage medium, comprising computer-readable program code means for causing a computer to perform the following steps:

determining, on a display, a first pointer position and displaying, on the display, surrounding the first pointer position, a first plurality of individually selectable fields, each of which represents a subset of objects from a set of objects;

moving the pointer to either of the first individually selectable fields for selecting the indicated field based on user input;

alternately displaying, on the display, surrounding the selected field, an additional plurality of individually selectable fields, each of which either represents an individual object or a further subset of objects from the subset of objects represented in the previously selected field, and moving the pointer to either of the additional individually selectable fields for selecting the indicated additional field based on user input until the additional field selected represents an individual object;

performing an entry of the individual object represented into the selected additional field based on user input.

20. The computer program product of claim 19, further comprising computer-readable program code means for causing a computer to perform the following steps:

providing a set of objects being a set of graphical characters, where an individual object is an individual graphical character;

retrieving a subset of candidate words from a dictionary storage means based on either the character represented in the selected additional field or the character represented in the selected additional field and at least one previously entered character;

displaying, on the display, surrounding the selected additional field, a further plurality of individually selectable fields, each of which represents one candidate word from the subset of candidate words;

moving the pointer to either of the further individually selectable fields for performing a selection of the indicated further field based on user input;

performing an entry of the candidate word represented into the selected further field based on user input.

\* \* \* \* \*